(12) United States Patent
Zanfei et al.

(10) Patent No.: US 9,102,381 B2
(45) Date of Patent: Aug. 11, 2015

(54) WHEEL FOR PEDAL-ASSISTED BIKES

(75) Inventors: Adriano Zanfei, Rovereto (IT); Fabio Giorgi, Rovereto (IT)

(73) Assignee: C.R.D. CENTRO RICERCHE DUCATI TRENTO S.R.L., Rovereto (IT)

( * ) Notice: Subject to any disclaimer, the term of this patent is extended or adjusted under 35 U.S.C. 154(b) by 0 days.

(21) Appl. No.: 14/005,033

(22) PCT Filed: Mar. 12, 2012

(86) PCT No.: PCT/IB2012/000456
§ 371 (c)(1),
(2), (4) Date: Sep. 27, 2013

(87) PCT Pub. No.: WO2012/123801
PCT Pub. Date: Sep. 20, 2012

(65) Prior Publication Data
US 2014/0035347 A1   Feb. 6, 2014

(30) Foreign Application Priority Data

Mar. 16, 2011   (IT) .............................. MO2011A0060

(51) Int. Cl.
| B60L 11/18 | (2006.01) |
| B62M 6/65 | (2010.01) |
| B62M 6/50 | (2010.01) |
| B62M 11/16 | (2006.01) |

(52) U.S. Cl.
CPC . B62M 6/65 (2013.01); B62M 6/50 (2013.01); B62M 11/16 (2013.01)

(58) Field of Classification Search
CPC ...... B60L 7/18; B60K 7/0007; B60K 17/046; B60K 2007/0038; B60K 2007/0092; B62M 7/12; B62M 6/65
USPC ....... 301/6.5, 67 R; 180/65.51, 220; 475/149; 192/64
See application file for complete search history.

(56) References Cited

U.S. PATENT DOCUMENTS

| 533,912 | A | * | 2/1895 | Moise | ............................. 192/64 |
| 6,468,178 | B1 | * | 10/2002 | Mohtasham | ................. 475/277 |
| 2005/0253356 | A1 | | 11/2005 | Matsueda et al. | |
| 2011/0259658 | A1 | * | 10/2011 | Huang et al. | .............. 180/65.51 |

FOREIGN PATENT DOCUMENTS

| CN | 201 161 693 | 12/2008 |
| EP | 0 537 693 | 4/1993 |

(Continued)

OTHER PUBLICATIONS

International Search Report dated Jul. 5, 2012, corresponding to PCT/IB2012/000456.

*Primary Examiner* — Brodie Follman
*Assistant Examiner* — Brian Cassidy
(74) *Attorney, Agent, or Firm* — Young & Thompson

(57) ABSTRACT

A wheel for pedal-assisted bikes includes a fixed structure associable with the frame having a driving pedal crank; a circle element rotatably mounted on the structure around a main rotation axis; a propulsion disc rotatably mounted on the structure and connectable to the driving pedal crank; motion transmission elements for transmitting rotary motion from the disc to the circle element, including a speed gear device for changing the motion transmission ratio from the disc to the circle element; and a first detection device suitable for detecting the force transmitted to the circle element from the disc; an electric motor associated with the structure for cooperating with the disc to motorize the circle element; a power supply for electrically supplying the motor; a processing and control unit for controlling the activation of the motor according to the force detected by the first detection device.

20 Claims, 11 Drawing Sheets

(56) References Cited

FOREIGN PATENT DOCUMENTS

| | | |
|---|---|---|
| EP | 1 500 582 | 1/2005 |
| FR | 2 873 090 | 1/2006 |
| JP | 2003 095180 | 4/2003 |
| JP | 2003 095181 | 4/2003 |
| JP | 2003 104275 | 4/2003 |

\* cited by examiner

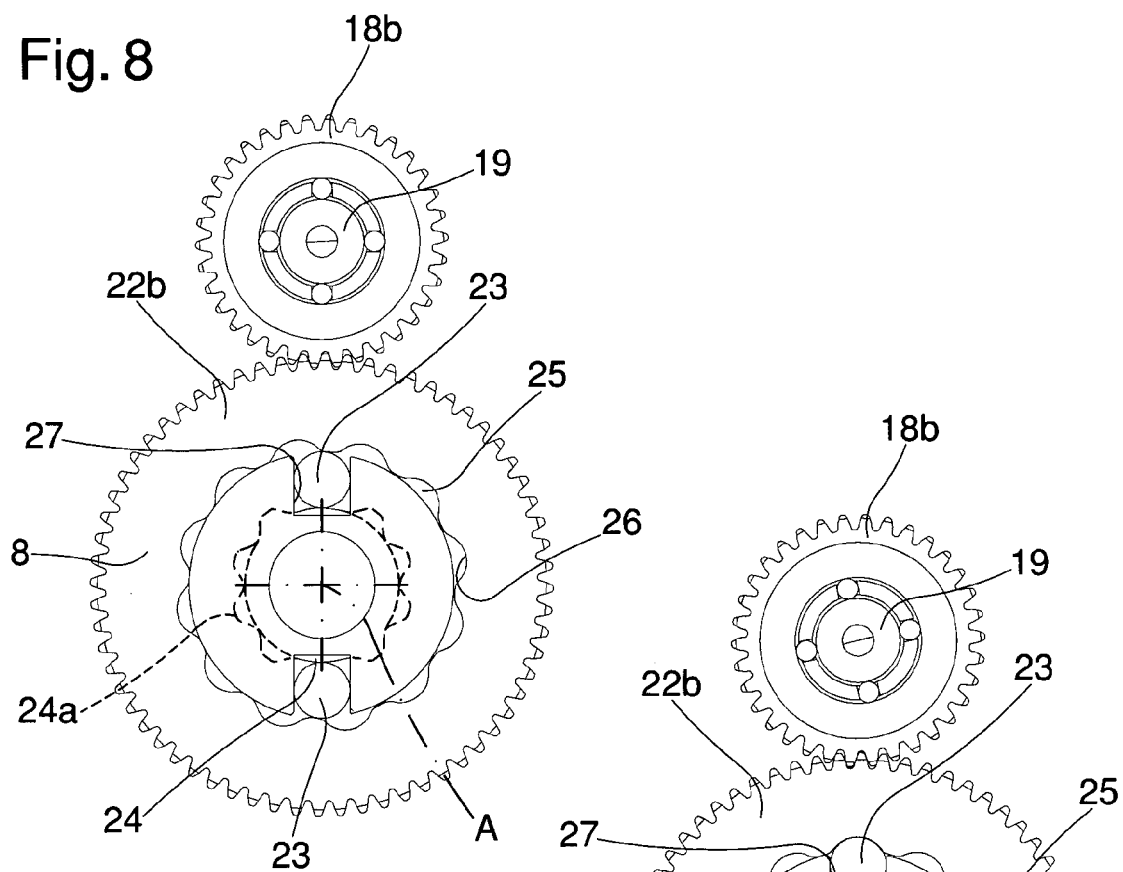
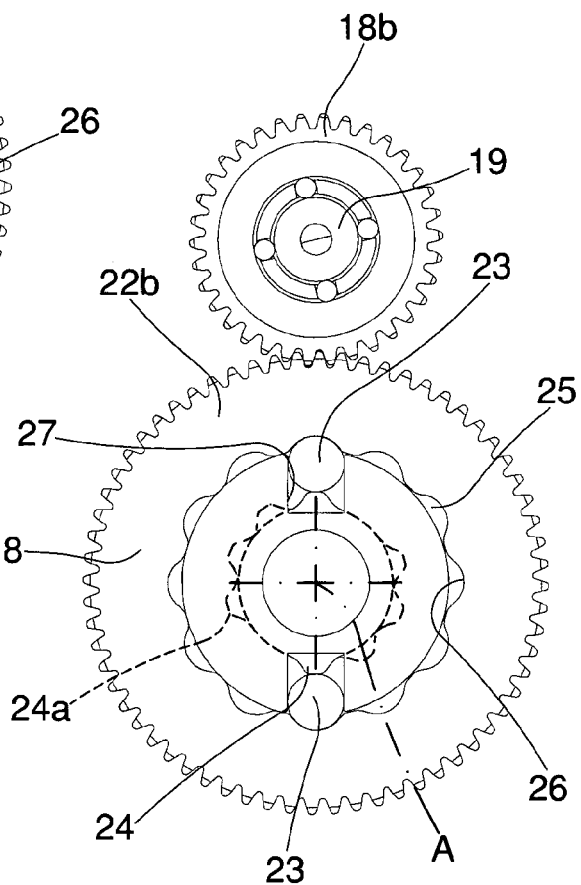
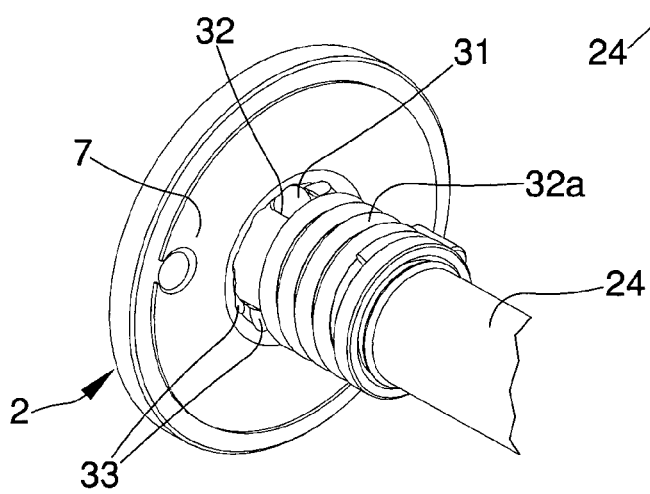

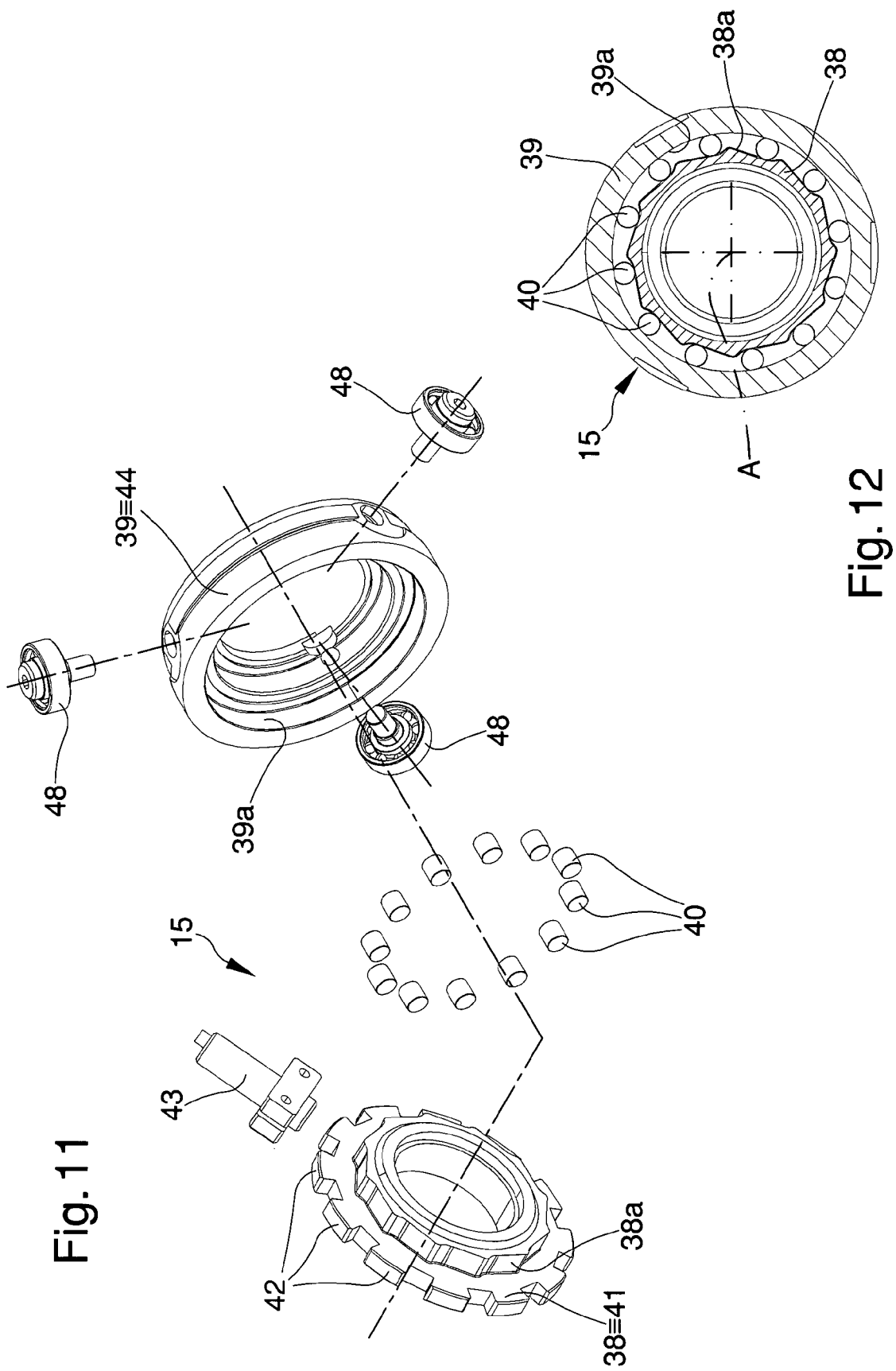

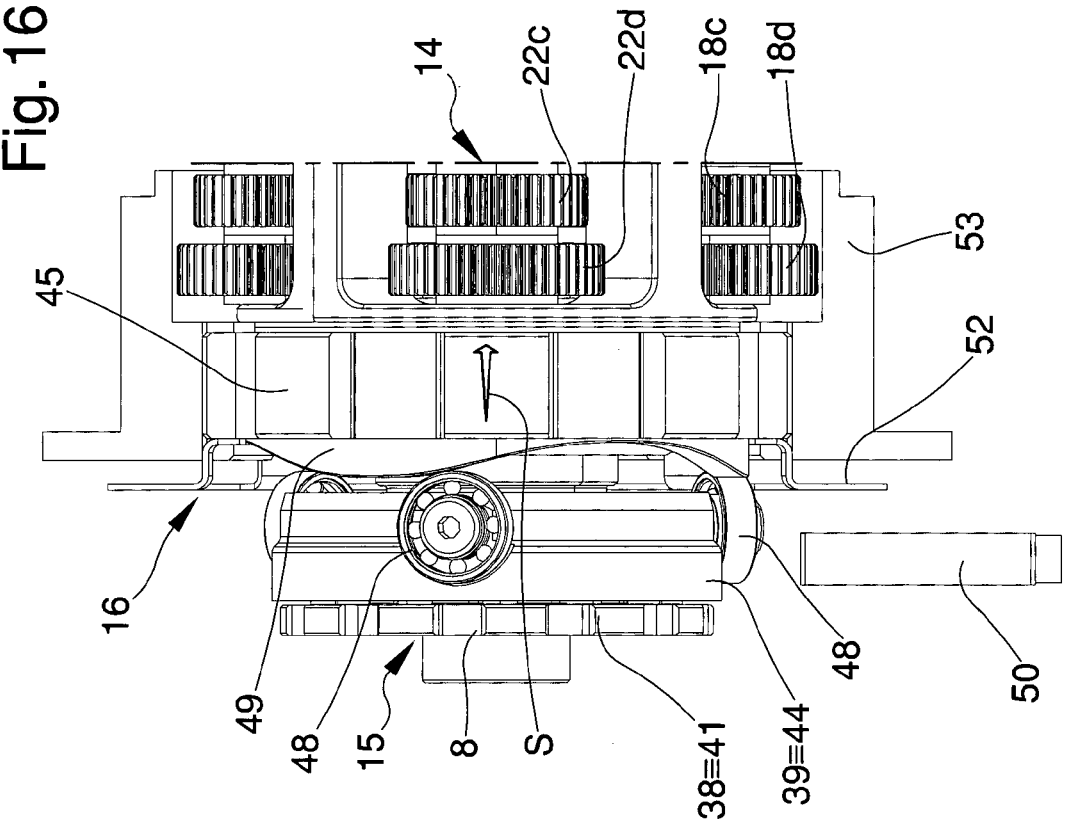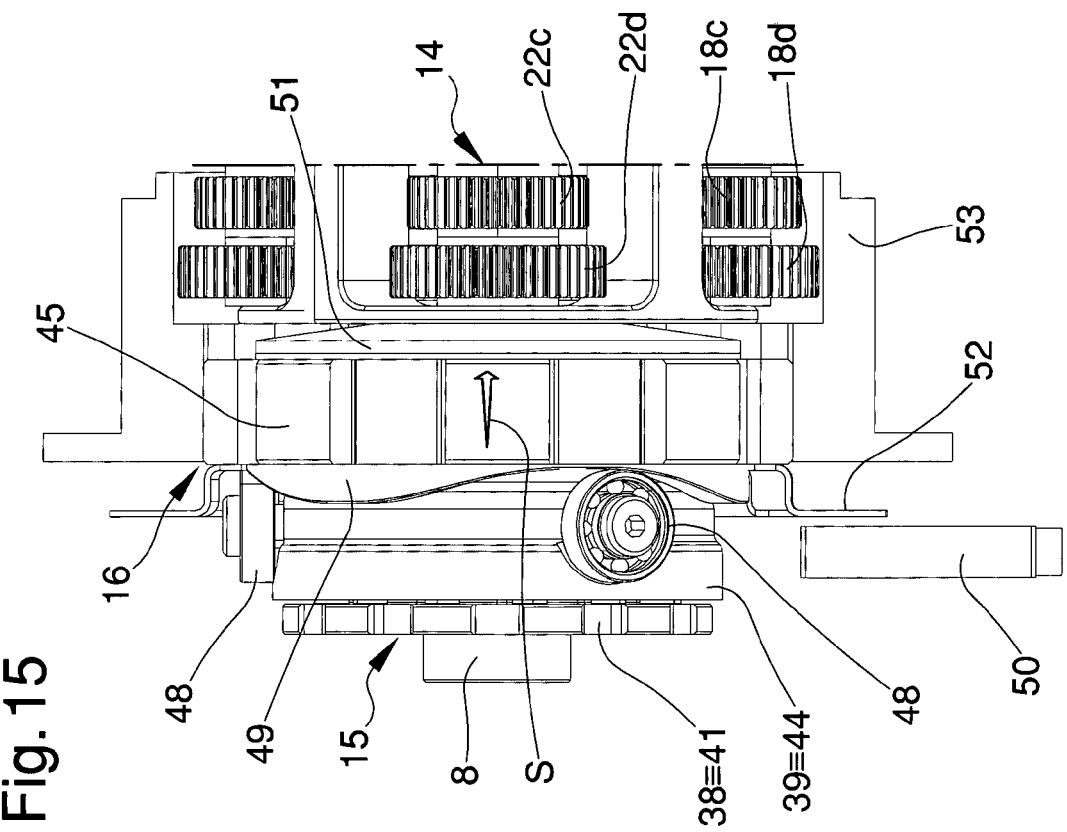

WHEEL FOR PEDAL-ASSISTED BIKES

TECHNICAL FIELD

The present invention relates to a wheel for pedal-assisted bikes.

BACKGROUND ART

Pedal-assisted bikes are bicycles with an auxiliary electric motor having the following specifications:
- maximum continuous power rating of the electric motor: 0.25 kW;
- motor supply gradually reduced and interrupted when 25 km/h is achieved;
- motor supply interrupted before 25 km/h if the cyclist stops pedalling.

The electric motor is controlled by means of a processing and control unit which controls the power supply according to the pedal force of the user, balancing the engagement of the transmission gradually from when pedalling starts, to make this smooth and regular.

For this purpose, pedal-assisted bikes have a force sensor in correspondence to the pedals or a speed sensor positioned in the pedal crank or both.

In traditional pedal-assisted bikes, the electric motor is housed directly in the hub of the motorised wheel and is powered by a battery pack which, instead, is fitted on the bicycle frame.

Considering the need to equip the bike with all the aforementioned components designed to perform various different functions, the traditional pedal-assisted systems are usually conceived, right from the design stage, to be fitted on a specific bike model.

Only rarely in fact is it possible to develop a kit able to adapt to several bike models, taking into account the considerable differences between the bicycles on the market, in particular their frames which, of course, have shapes and dimensions so different as to prevent a practical and complete standardisation of pedal-assisted systems.

It must also be underlined that the fitting of a kit for pedal-assisted bikes during the after-sales stage, even if this were possible, usually calls for the performance of inconvenient and not very practical operations concerning the adjustment and the fitting of the various components to the frame which more often than not cannot be performed by the end user and requires the intervention of an expert technician.

To partially overcome the aforementioned drawbacks, the integration is known in the motorised wheel of not only the electrical drive motor but also of the battery pack, as described for example in the patent document WO 2010/091323.

This constructive solution however is not without drawbacks either.

In this respect, it should first of all be noticed that the integration of the battery pack in the motorised wheel only in part simplifies pedal-assisted system fitting and removal operations because it in any case remains necessary to install force and/or speed sensors on the bike pedal crank, as well as all other components.

To this must be added that, quite apart from where the battery pack is positioned either on the wheel or on the frame, the motorised wheels for pedal-assisted bikes can not always be combined in a practical and easy way with the traditional mechanical gears usually used to reduce or multiply the motion transmission ratio from the pedal crank.

The fact that the hub of the motorised wheel is almost completely occupied by the electric motor in fact determines the fact that this wheel cannot be combined with gear change devices inside the hub, such as, e.g., the Rohloff gear change but can only be combined with external devices, such as traditional derailleur gears, which nevertheless are not standardised and vary according to the bike model.

DESCRIPTION OF THE INVENTION

The main object of the present invention is to provide a wheel for pedal-assisted bike that can be fitted on any traditional already-existing bike model, providing this, in a practical, easy and functional way, with the functions of pedal-assisted bikes.

Another object of the present invention is to provide a wheel for pedal-assisted bikes that allows overcoming the mentioned drawbacks of the background art within the ambit of a simple, rational, easy and effective to use as well as low cost solution.

The above mentioned objects are achieved by the present wheel for pedal-assisted bikes, characterised in that it comprises:
- at least a fixed structure associable with the frame of a bike having a driving pedal crank;
- at least a circle element mounted on said fixed structure in a rotatable way around a main rotation axis;
- at least a propulsion disc mounted on said fixed structure in a rotatable way and connectable to said driving pedal crank;
- motion transmission means for the transmission of the rotary motion from said propulsion disc to said circle element, comprising:
  - at least a speed gear device suitable for changing the motion transmission ratio from said propulsion disc to said circle element; and
  - at least a first detection device suitable for detecting the force transmitted to said circle element from said propulsion disc;
- at least an electric motor associated with said fixed structure and suitable for cooperating with said propulsion disc to motorize said circle element;
- at least a power supply unit associated with said fixed structure and suitable for electrically supplying said electric motor;
- at least a processing and control unit associated with said fixed structure, operatively connected to said first detection device and to said electric motor and suitable for controlling the activation of said electric motor according to the force detected by said first detection device.

BRIEF DESCRIPTION OF THE DRAWINGS

Other characteristics and advantages of the present invention will become more evident from the description of a preferred, but not sole, embodiment of a wheel for pedal-assisted bikes, illustrated purely as an example but not limited to the annexed drawings in which:

FIG. 8 is a crosswise, schematic and partial section view, which shows the speed gear device of the wheel according to the invention with one of the sun gears in release position;

FIG. 9 is a crosswise, schematic and partial section view, which shows the speed gear device of the wheel according to the invention with one of the sun gears in locking position;

FIG. 10 is an axonometric view which shows a portion of the speed gear device of the wheel according to the invention;

FIG. 11 is an exploded view of the freewheel mechanism of the wheel according to the invention;

FIG. 12 is a crosswise section view of the freewheel mechanism of the wheel according to the invention;

FIGS. 15 and 16 show, in a sequence of side views, the operation of the first detection device of the wheel according to the invention.

EMBODIMENTS OF THE INVENTION

With particular reference to such Figures, globally indicated by 1 is a wheel for pedal-assisted bikes.

The wheel 1 is set to be fitted on any type of bike B having a frame T and a driving pedal crank P.

Figure 1:
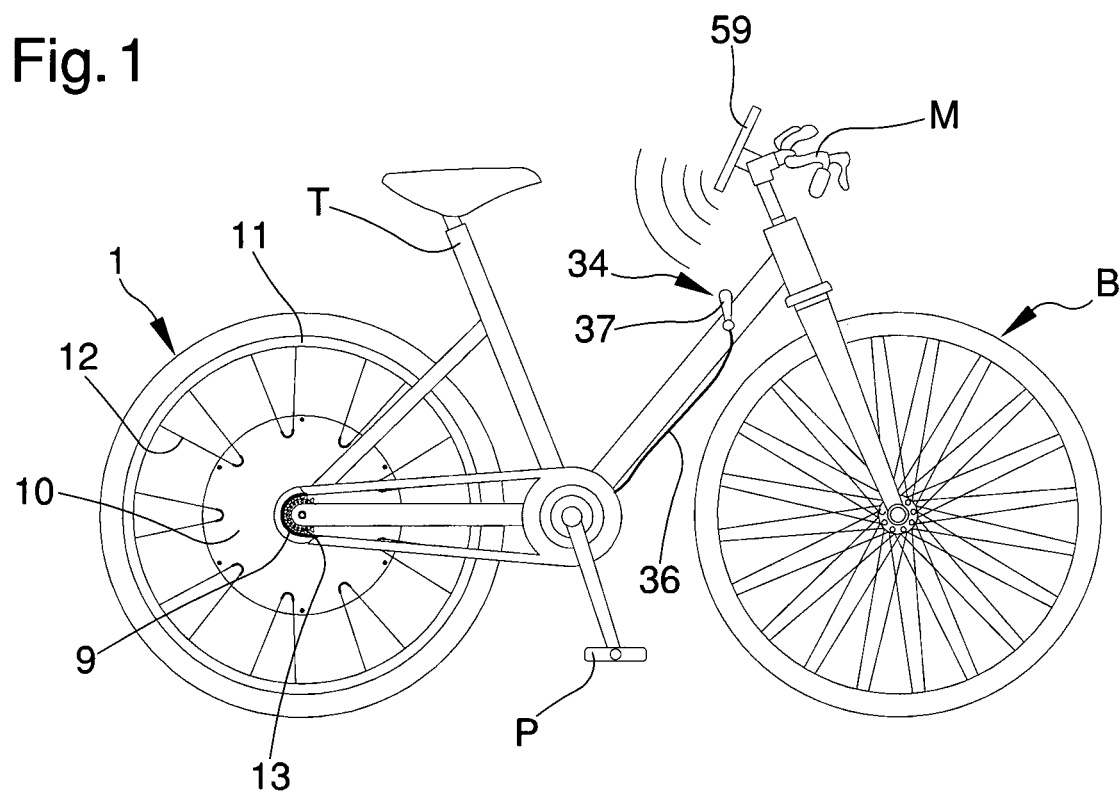
FIG. 1 is a side view of a bike with the wheel according to the invention.
Figure 2:
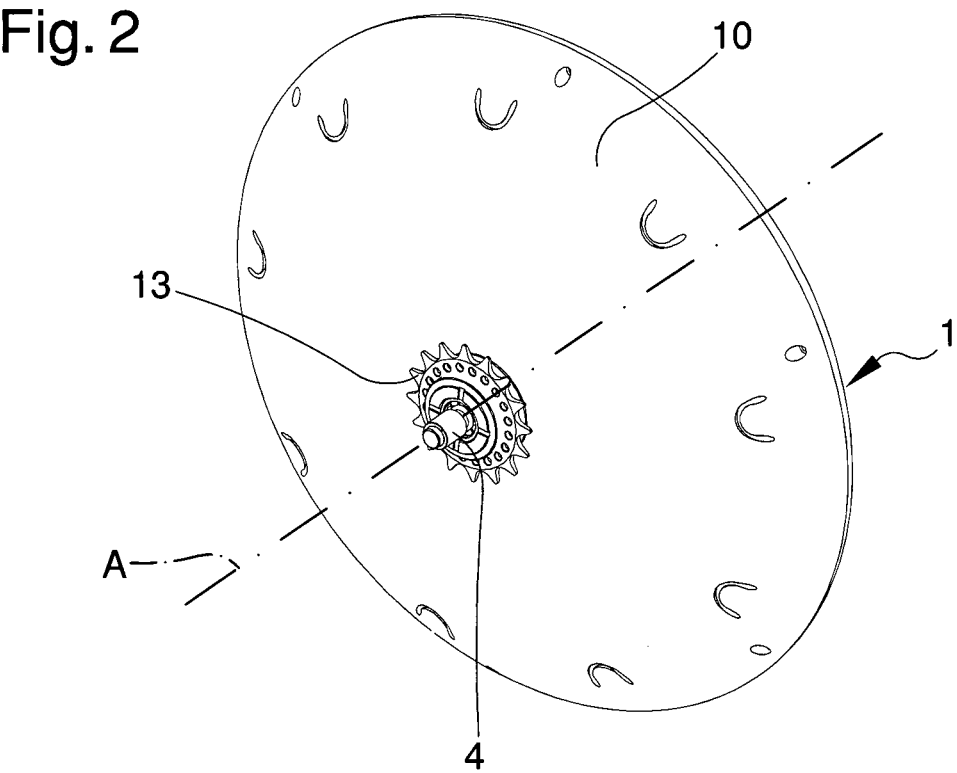
FIG. 2 is an axonometric view of a portion of the wheel according to the invention.
Figure 3:
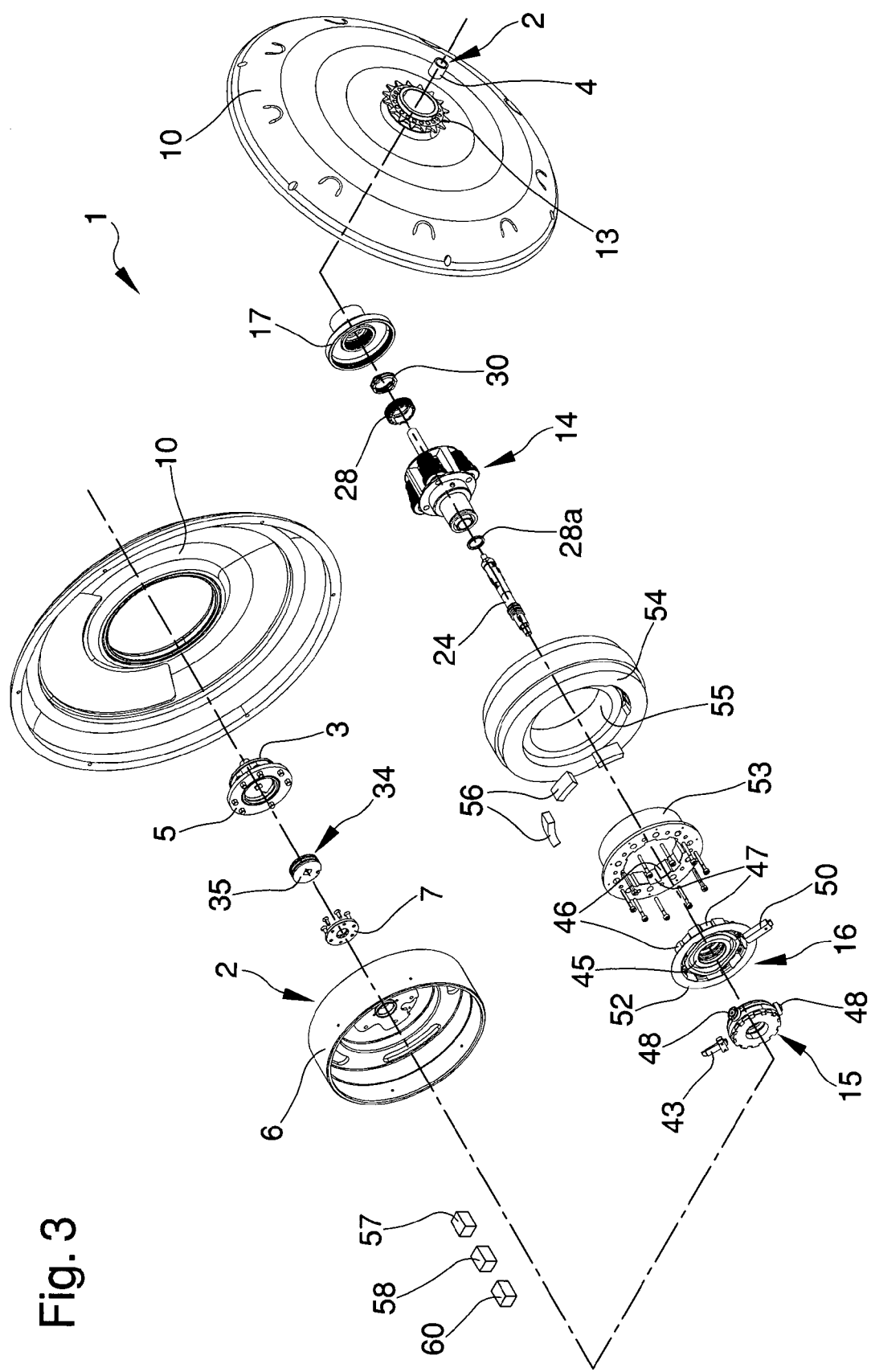
FIG. 3 is an exploded view of the portion of wheel in FIG. 2.
Figure 4:
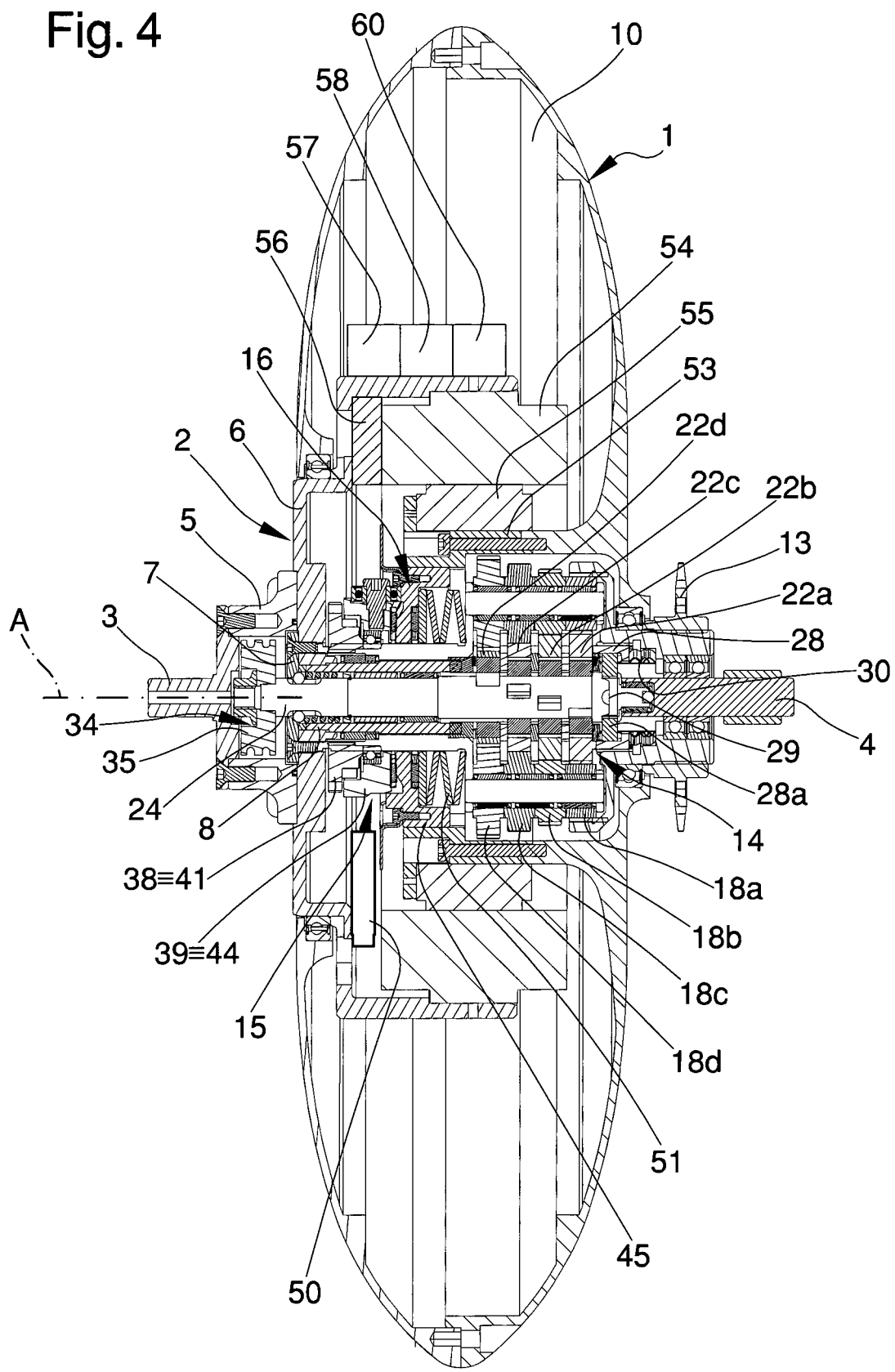
FIG. 4 is an axial section view of the portion of wheel in FIG. 2.
Figure 5:
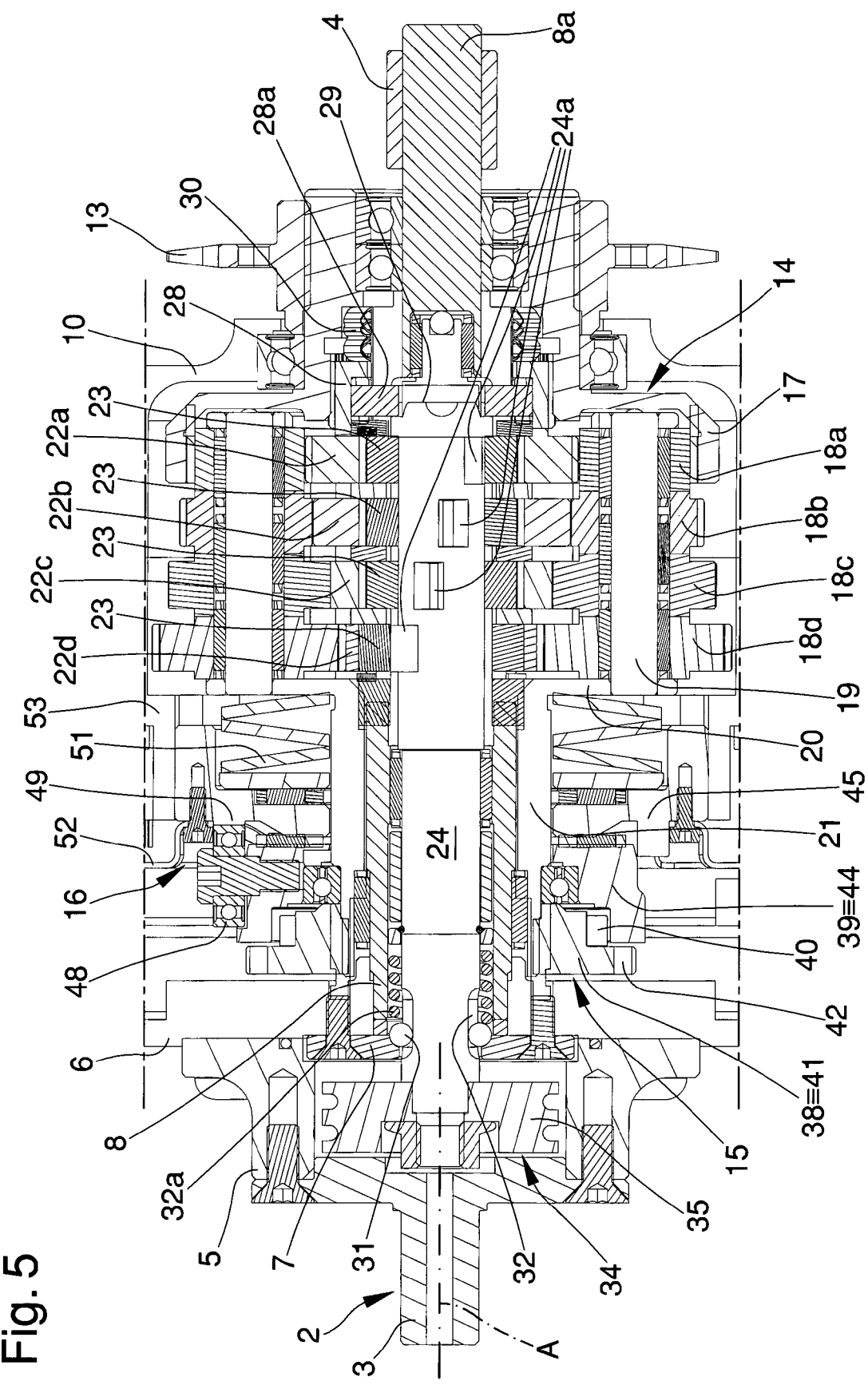
FIG. 5 is a section view, on enlarged scale, of a detail of FIG. 4.
Figure 6:
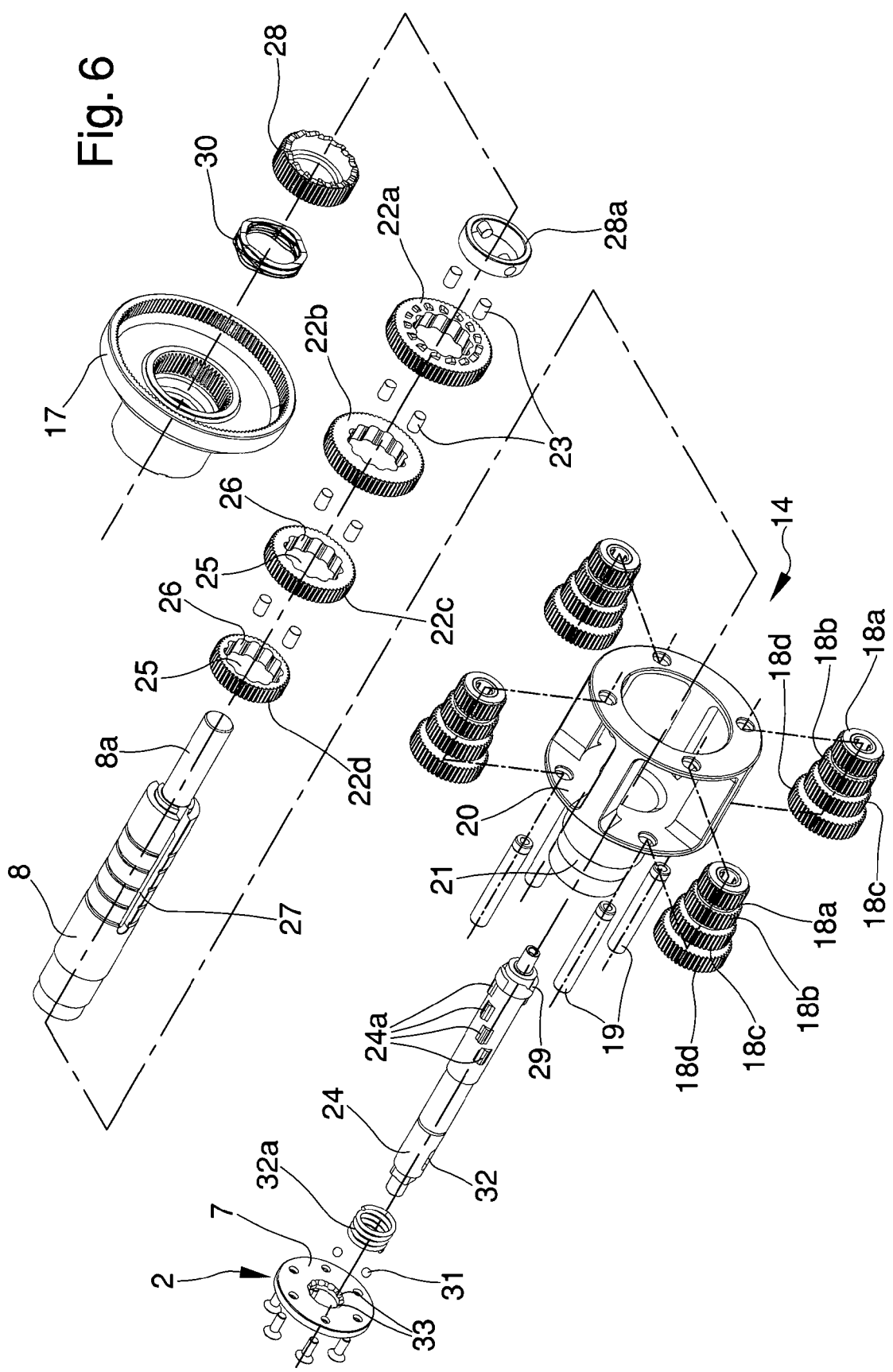
FIG. 6 is an exploded view of the speed gear device of the wheel according to the invention.
Figure 7:
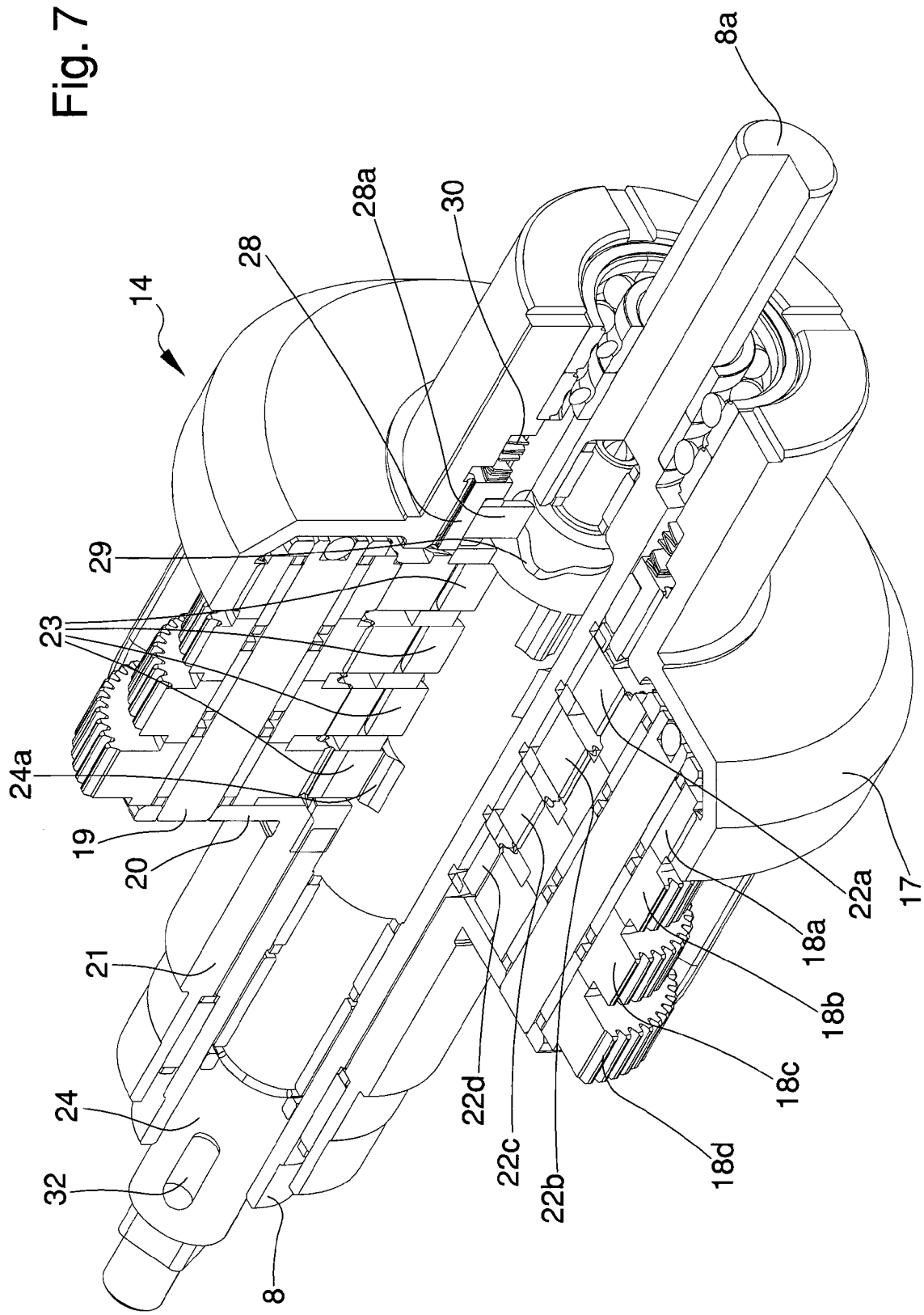
FIG. 7 is a broken view of the speed gear device of the wheel according to the invention.
Figure 13:
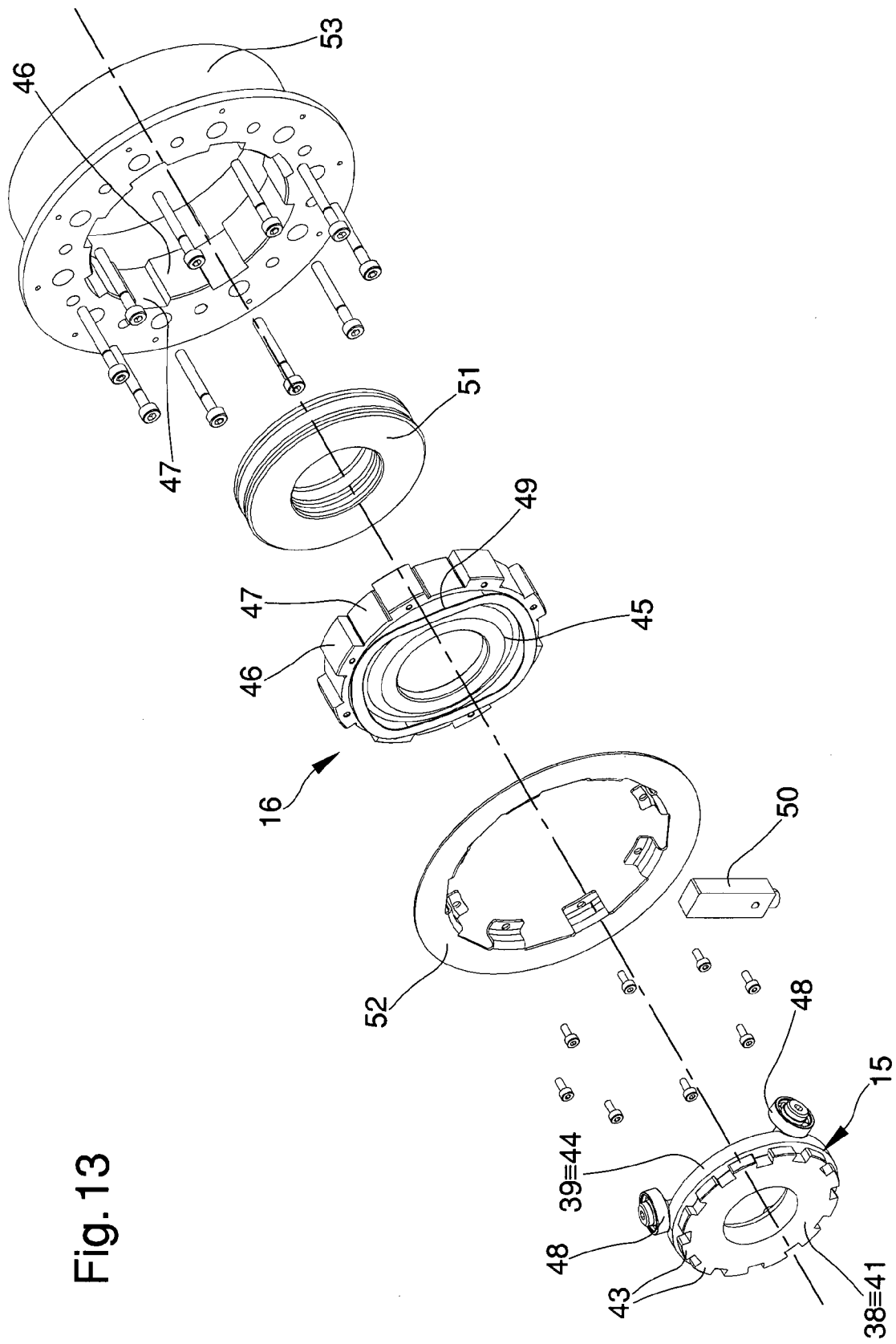
FIG. 13 is an exploded view of the first detection device of the wheel according to the invention.
Figure 14:
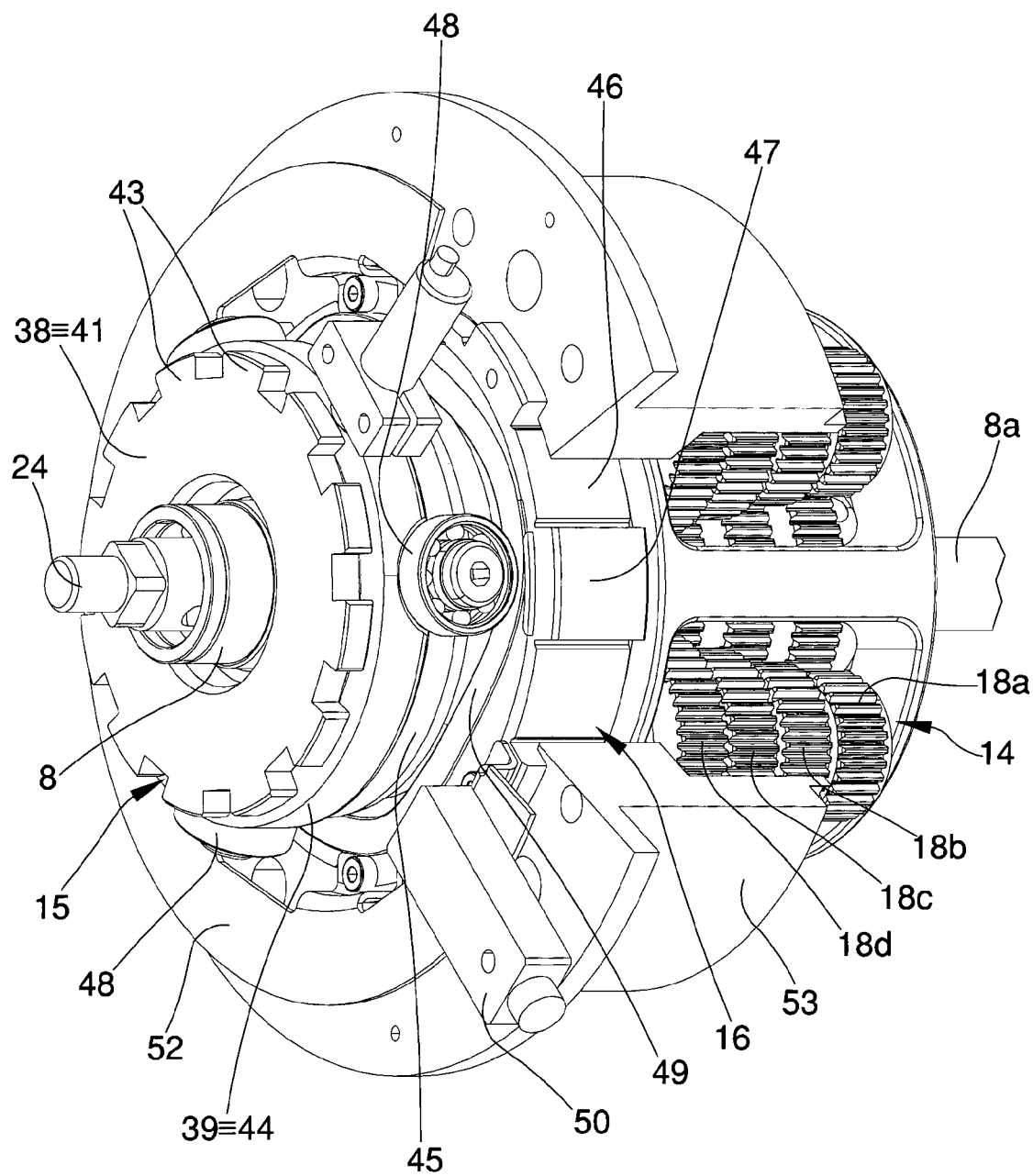
FIG. 14 is an axonometric, partially broken, view of the motion transmission means of the wheel according to the invention.

In the particular embodiment shown in FIG. 1, for example, the wheel 1 is fitted as rear wheel of the bike B.

For this purpose, the wheel 1 comprises a fixed structure 2 which is associable with the rear part of the frame T and which, in particular, has a first axle 3 and a second axle 4 arranged on opposite sides of the wheel 1 and fixable to the frame T in a way in itself traditional.

The first axle 3 is rigidly associated with a cup element 5, in turn rigidly associated with a disc element 6, at the centre of which a plaque 7 is screwed on and a sleeve 8 is interlocked.

The sleeve 8 ends up with a pin extremity 8a which supports or defines the second axle 4.

In the particular embodiment shown in the illustrations, the fixed structure 2 is therefore made up of the axles 3, 4, of the cup element 5, of the disc element 6, of the plaque 7 and of the sleeve 8.

On the fixed structure 2 is fitted in a rotatable way a circle element 10, 11, 12.

The circle element 10, 11, 12 can turn with respect to the fixed structure 2 around a main rotation axis A coaxial with the axles 3, 4.

The circle element 10, 11, 12 comprises:
  a central boxed casing 10, with a substantially discoid shape;
  an external circular framework 11, supporting a tyre for the circulation of the bike B on the road; and
  a series of tie-rods 12 for connecting the central boxed casing 10 to the external circular framework 11.

In correspondence to the second axle 4 of the fixed structure 2 is fitted in a rotatable way a propulsion disc 13, e.g., of the traditional gear pinion type, which can be connected to the driving pedal crank P by means of a flexible part 9 such as a chain or the like.

With the propulsion disc 13 are associated motion transmission means 14, 15, 16 suitable for transferring the rotation motion from the propulsion disc 13 to the circle element 10, 11, 12.

The motion transmission means 14, 15, 16 comprise:
  a speed gear device 14 suitable for changing the motion transmission ratio from the propulsion disc 13 to the circle element 10, 11, 12;
  a freewheel mechanism 15; and
  a first detection device 16 suitable for detecting the force (or, in other words the torque) coming from the propulsion disc 13 and transmitted to the circle element 10, 11, 12.

More in detail, it is underlined that the succession of connections along which the motion is transmitted from the propulsion disc 13 to the circle element 10, 11, 12 is the following: the propulsion disc 13 is associated with the speed gear device 14 which is associated with the freewheel mechanism 15 which is associated with the first detection device 16 which is associated with the circle element 10, 11, 12.

It must also be noted that the first detection device 16 is usefully integrated in the motion transmission means 14, 15, 16 and represents a fundamental part of this to transmit motion to the circle element 10, 11, 12, as will be better described below.

The speed gear device 14 is substantially coaxial to the main rotation axis A and is of the planetary type.

More in detail, the speed gear device 14 comprises:
  an annulus gear 17 with inner teeth, fitted on the second axle 4 in a rotatable way around the main rotation axis A and on which the propulsion disc 13 is keyed;
  a plurality of first groups of planet gears 18a, 18b, 18c, 18d. The planet gears 18a, 18b, 18c, 18d of each first group are made integral with one another and have a different number of teeth. In particular, the planet gears 18a, 18b, 18c, 18d of each group are made separately and then joined together, e.g. by welding or slot-in coupling. In the particular embodiment shown in the illustrations, there are four planet gears 18a, 18b, 18c, 18d for each group and they have a primary planet gear 18a engaging with the inner teeth of the annulus gear 17, a secondary planet gear 18b adjacent to the primary one, a tertiary planet gear 18c adjacent to the secondary one and a quaternary planet gear 18d adjacent to the tertiary one. Alternative embodiments cannot however be ruled out having a different number of planet gears 18a, 18b, 18c, 18d;
  a planet carrier body 19, 20, 21 supporting the first groups of planet gears 18a, 18b, 18c, 18d. The planet carrier body 19, 20, 21, in particular, has a series of axes 19 supporting in a rotatable way the first groups of planet gears 18a, 18b, 18c, 18d and which are associated with a transversal plate 20 terminating in a coupling 21, which is fitted around the sleeve 8, is rotatable coaxially with the main rotation axis A and represents the exit motor body of the speed gear device 14;
  a second group of sun gears 22a, 22b, 22c, 22d, which are not directly connected the one to the other and can turn with different rotation speeds around the main rotation axis A. The sun gears 22a, 22b, 22c, 22d have a different number of teeth and engage with a respective planet gear 18a, 18b, 18c, 18d of each first group. In particular, the sun gears 22a, 22b, 22c, 22d are split into a primary sun gear 22a engaging with the primary planet gear 18a, a secondary sun gear 22b engaging with the secondary planet gear 18b, a tertiary sun gear 22c engaging with the tertiary planet gear 18c and a quaternary sun gear 22d engaging with the quaternary planet gear 18d; and a locking device 23, 24 for the selective locking of the sun gears 22a, 22b, 22c, 22d. The locking device 23, 24, in particular, is suitable for preventing alternatively the rotation of just one of the sun gears 22a, 22b, 22c, 22d and releasing the rotation of the remaining ones. This way, the transmission ratio between the annulus gear 17 and the planet carrier body 19, 20, 21 depends on which sun gear 22a, 22b, 22c, 22d remains locked.

All the sun gears 22a, 22b, 22c, 22d comprise a central hole 25 which allows them to be positioned around the sleeve 8 and the housing of the locking device 23, 24.

The central holes 25 of the sun gears 22a, 22b, 22c, 22d are shaped so as to define a plurality of grooves 26.

Advantageously, the locking device 23, 24 comprises two groups of locking bodies 23, arranged on diametrically opposite sides of the main rotation axis A and fitted in succession along two corresponding longitudinal slots 27 obtained in the sleeve 8.

The operation of the locking bodies 23 of one group is the same as those of the other group and, consequently, to make exposition easier in the rest of the present description, reference will be made to just one group of locking bodies 23.

Each locking body 23 is housed in the longitudinal slot 27 in correspondence to the central hole 25 of a respective sun gear 22a, 22b, 22c, 22d and is mobile perpendicular to the main rotation axis A between a locking position, wherein it is fitted in one of the grooves 26 obtained in the respective sun gear 22a, 22b, 22c, 22d preventing its rotation (FIG. 9), and a release position wherein it is moved away from the grooves 26 and the respective sun gear 22a, 22b, 22c, 22d is released (FIG. 8).

The locking device 23, 24, furthermore, comprises an operating shaft 24 which is housed in the sleeve 8 and, therefore, is arranged inside the central holes 25 coaxially to the sun gears 22a, 22b, 22c, 22d.

The operating shaft 24 has two series of eccentric profiles 24a, one for each group of locking bodies 23.

The eccentric profiles 24a are suitable for cooperating with the locking bodies 23 for their movement between the locking position and the release position.

The angular positions of the eccentric profiles 24a are substantially staggered the one to the other (in particular by around 36°) and the operating shaft 24 is rotatable around its own axis, coinciding with the main rotation axis A, in a series of operative angular positions wherein one of the eccentric profiles 24a places the corresponding locking body 23 in the locking position while the other locking bodies 23 remain in release position.

Usefully, the speed gear device 14 also comprises a solidarization mechanism 28, 29 suitable for making the annulus gear 17 and the planet carrier body 19,20,21 integral with each other. The solidarization mechanism 28, 29 comprises:

a solidarization element 28 secured to the annulus gear 17 in a prismatic way, i.e., it cannot rotate with respect to this but is sliding along a direction parallel to the main rotation axis A between a coupling position, wherein the solidarization element 28 is rigidly engaged with the primary sun gear 22a, and an idle position, wherein the solidarization element 28 is moved away and released from the primary sun gear 22a; and a helical profile 29 obtained on the operating shaft 24 and suitable for cooperating with an auxiliary element 28a associated with the solidarization element 28 for its movement between the coupling position and the idle position in contrast to an elastic return body 30, of the type of a spring or the like.

In practice, with reference to the particular embodiment of the invention shown in the illustrations, the operating shaft 24 can be placed in four operative angular positions, corresponding to the selective locking of the four sun gears 22a, 22b, 22c, 22d and to the positioning of the solidarization element 28 in idle position, and in a fifth operative angular position, corresponding to the release of all four sun gears 22a, 22b, 22c, 22d and to the placement of the solidarization element 28 in coupling position.

Advantageously, a retention mechanism 31, 32, 33 is also provided suitable for retaining the operating shaft 24 in the operative angular positions.

The retention mechanism 31, 32, 33 comprises two retention bodies 31, of the type of two small balls or the like, fitted in two corresponding longitudinal grooves 32 obtained on the operating shaft 24.

Along the longitudinal grooves 32, in practice, the two retention bodies 31 are secured to the operating shaft 24 in a way sliding along a direction parallel to the main rotation axis A between an engaged position, wherein the retention bodies 31 are fitted in corresponding seats 33 obtained on the plaque 7 of the fixed structure 2, and a disengaged position, wherein the retention bodies 31 are moved away and released from the seats 33.

The plaque 7, in particular, has a plurality of seats 33, at least one for each operative angular position (FIG. 10).

The small balls 31 are pushed towards the seats 33 by means of a spring 32a which tends to keep them in engaged position until, by means of the application of an external force, the operating shaft 24 is made to rotate around itself forcing the small balls 31 into the disengaged position until the subsequent operative angular position is reached.

For the selection of the transmission ratio by a user, the speed gear device 14 has a control system 34.

The control system 34 consists of an actuator element for placing in rotation the operating shaft 24 around its own axis between the different operative angular positions.

In the particular embodiment shown in the illustrations, the actuator element 34 comprises a coupling body 35, with a substantially cylindrical shape, which is housed in the cup element 5, is keyed to one extremity of the operating shaft 24 and is to be connected to a control wire 36. The control wire 36, in particular, can consist of a tie rod having one extremity stably attached to the coupling body 35 and the opposite extremity associated with a control lever 37, located on the frame T of the bike B.

Alternative embodiments of the invention are however possible wherein the actuator element 34 consists in a motorized body, of the type of an electric actuator, of the step-by-step or continuous type, which is intended to make the operating shaft 24 rotate in an automated way and is interlocked with an electronic start signal given by the user.

Around the coupling 21 of the planet carrier body 19, 20, 21 are arranged both the freewheel mechanism 15 and the first detection device 16.

The freewheel mechanism 15 comprises a first rotating part 38, keyed to the coupling 21, and a second rotating part 39, fitted on the coupling 21 in a rotatable way and which can be dragged in rotation by the first rotating part 38 as long as the user applies to the driving pedal crank P a rotation equal to or greater than that of the circle element 10, 11, 12.

For this purpose the first rotating part 38 and the second rotating part 39 comprise two respective side surfaces 38a, 39a, penetrated the one in the other and separated from one another to house a series of small cylinders 40.

One of the side surfaces 38a, 39a is stepped so that if the first rotating part 38 rotates in one direction then solidarization occurs of the second rotating part 39 by the small cylinders 40, while if it turns in the opposite direction, then the small cylinders 40 are free to slide on the second rotating part 39 without dragging it in rotation.

In correspondence to the freewheel mechanism 15 a second detection device 41, 42, 43 is provided suitable for detecting the rotation speed at exit from the speed gear device 14.

The second detection device 41, 42, 43, in particular, comprises a phonic wheel 41, coinciding with the first rotating part 38, which for this purpose has a series of protuberances 42 the transit of which during rotation is detected by means of a pickup sensor 43, of the optical, magnetic type or the like, fitted on the disc element 6 of the fixed structure 2.

The first detection device 16 comprises:
- a first plate 44, coinciding with the second rotating part 39 of the freewheel mechanism 15, which is rotatable around the main rotation axis A and can be operated in rotation by the motion of the propulsion disc 13, which by means of the speed gear device 14 and of the freewheel mechanism 15 reaches the first plate 44;
- a second plate 45 associated with the circle element 10, 11, 12 by means of a prismatic coupling 46, 47, suitable for making it rotatable around the main rotation axis A together with the circle element 10, 11, 12 and, at the same time, sliding with respect to the circle element 10, 11, 12 along a sliding direction S (FIGS. 15 and 16) substantially parallel to the main rotation axis A;
- at least one motion transmission body 48 for transmitting motion between the first plate 44 and the second plate 45, which is associated with the first plate 44 and is suitable for engaging a grip ramp 49 associated with the second plate 45 and inclined with respect to a plane transversal to the main rotation axis A. In practice, the engagement of the grip ramp 49 by the motion transmission body 48 determines the sliding of the second plate 45 along a sliding direction S until it takes up a position which depends on the force transmitted to the second plate 45;
- a detection sensor 50 suitable for detecting the position of the second plate 45; and
- elastic means 51 of contrast to the moving away of the second plate 45 from the first plate 44, preferably composed of a bellows spring having one extremity up against the second plate 45 and the opposite extremity up against the transversal plate 20.

Advantageously, the first plate 44 bears a plurality of motion transmission parts 48 which engage an equal number of grip ramps 49 obtained on the second plate 45.

The motion transmission parts 48, e.g., are composed of a series of bearings, of the ball type or the like, rotatable around respective axes at right-angles to the main rotation axis A.

The rotation motion is transmitted from the first plate 44 to the second plate 45 when the bearings 48 and the relative grip ramps 49 reach a specific relative position which permits transferring to the circle element 10, 11, 12 the force required by the load conditions during pedalling.

In fact, in low-load conditions (e.g., pedalling on the flat), the bearings 48 are able to transfer motion and drag in rotation the grip ramps 49 and the second plate 45 without any particular difficulty (FIG. 15).

In heavier load conditions (e.g., pedalling uphill), instead, the first plate 44 is unable to immediately grip on the second plate 45.

The first plate 44, therefore, spins freely with respect to the second plate 45 for a certain angle of rotation, which determines the engagement of the grip ramps 49 by the bearings 48 and the sliding of the second plate 45 along the sliding direction S in contrast to the elastic means 51. Such sliding stops as soon as the bearings 48 are able to transmit enough force to the grip ramps 49 to drag these in rotation, and, along with them, also the second plate 45 and the circle element 10, 11, 12 (FIG. 16).

In the same way, it is underlined that during pedalling the user applies a thrust on the driving pedal crank P which has a discontinuous pattern, characterised by the alternation of continuous maximums and minimums.

In correspondence to the thrust maximums, the first plate 44 receives a force in excess to that needed to drag the second plate, and this determines the elevation of the bearings 48 on the grip ramps 49.

In correspondence to the thrust minimums, instead, the force which reaches the first plate 44 is less and the bearings 48 engage the grip ramps 49 in a different position.

It therefore appears clear how, depending on the force transmitted between the first plate 44 and the second plate 45, the bearings 48 assume a corresponding relative position on the grip ramps 49, determining a corresponding excursion of the second plate 45 along the sliding direction S.

Usefully, the detection sensor 50 is associated with the disc element 6 of the fixed structure 2 and is a contact-less distance sensor, of the magnetic or optical type, suitable for measuring the distance from a dish 52 which is rigidly fitted on the second plate 45 and is substantially at right angles to the sliding direction S.

The distance sensor 50, in practice, is still and facing the dish 52, which moves closer or away according to the movement of the second plate 45 along the sliding direction S.

Advantageously, the prismatic coupling 46, 47 by means of which the second plate 45 can slide along the sliding direction S consists in particular in a series of ribs 46 and of recesses 47 obtained on the outer surface of the second plate 45 and on the inner surface of a supporting hub 53 rigidly associated with the circle element 10, 11, 12.

The wheel 1 usefully has also an electric motor 54, 55, which is associated with the disc element 6 of the fixed structure 2 and is suitable for cooperating with the motion coming from the driving pedal crank P and from the propulsion disc 13 to motorise the circle element 10, 11, 12.

The electric motor 54, 55 comprises a statoric element 54 fitted on the disc element 6 and a rotoric element 55 associated with the supporting hub 53 and with the circle element 10, 11, 12.

The electric motor 54, 55 is e.g. of the Torque type with permanent or reluctance magnets or the like, with the statoric element 54 and the rotoric element 55 which are substantially ring-shaped and are arranged one inside the other substantially around the motion transmission means 14, 15, 16.

Such particular solution permits reducing the overall measurements in a practical and functional way.

The particular type of electric motor 54, 55 selected, furthermore, also permits providing the wheel 1 with a third detection device suitable for detecting the speed of the circle element 10, 11, 12.

The electric motor 54, 55, in fact, is able to provide information on the relative position between the fixed statoric element 54 and the mobile rotoric element 55, together with the circle element 10, 11, 12, permitting the calculation of the actual speed of the wheel 1 during the forward movement of the bike B on the road.

For the power supply of the electric motor 54, 55, the wheel 1 has a power supply unit 56 associated with the disc element 6 of the fixed structure 2.

The power supply unit 56 is made up, e.g., of one or more battery packs operatively connected to the statoric element 54 of the electric motor 54, 55.

On the fixed structure 2 is also fitted a processing and control unit 57 which is operatively connected to the first detection device 16, to the second detection device 41, 42, 43 and to the electric motor 54, 55 and is suitable for commanding the start of the electric motor 54, 55 depending on the force detected by the first detection device 16 and, if necessary, on other programmable operating parameters.

The processing and control unit 57 is associated with a wireless data transmission device 58, of the radio wave, Bluetooth type or the like, suitable for interfacing the processing and control unit 57 with an external electronic device 59, having a display screen and usable by a user.

The external electronic device 59 consists, e.g., of a dedicated on-board computer or of a software installable on the user's cell phone; in both cases, the external electronic device 59 can be fitted in a practical and convenient way on the handlebars M of the bike B and can be used to display the operating data of the processing and control unit (bike speed, pedalling speed, pedalling force, etc.) and to set the operating parameters.

The processing and control unit 57, furthermore, is operatively associated with a detection appliance 60, fitted usefully on the fixed structure 2 and suitable for detecting environmental pollution, i.e., able to measure the CO, $CO_2$, NO content or that of other polluting substances in the air.

If necessary, the data measured by the detection appliance 60 can also be displayed on the external electronic device 59.

It must also be underlined that in the event of the actuator element 34 consisting in a motorised part interlocked with an electronic start signal given by the user, the processing and control unit 57 can be set to manage the operation of this motorised part, if necessary by interfacing the external electronic device 59 enabling the user to select the most suitable transmission ratio during riding.

Usefully, the central boxed casing 10 of the circle element 10, 11, 12 is suitable for containing the main mechanical and electronic components of the wheel 1, in particular the motion transmission means 14, 15, 16, the electric motor 54, 55, the power supply unit 56 and the processing and control unit 57, but also the wireless data transmission device 58 and the detection appliance 60.

The operation of the present invention is the following.

During normal use of the bike B, the thrust produced by the user on the driving pedal crank P is transferred to the propulsion disc 13 which drags the annulus gear 17 in rotation.

Depending on the transmission ratio selected by means of the control system 34, the rotation motion is transferred from the annulus gear 17 to the coupling 21 which drags the first rotating part 38 in rotation.

At this point, by means of the pickup sensor 43, the pedalling speed produced by the user is detected.

By means of the freewheel mechanism 15 the rotation is transferred from the first rotating part 38 to the second rotating part 39 as long as the user applies to the driving pedal crank P a rotation equal to or greater than that of the circle element 10, 11, 12.

From the freewheel mechanism 15, the thrust generated on the driving pedal crank P is transmitted to the bearings 48 of the first plate 44 and, from these, to the grip ramps 49 of the second plate 45, to the supporting hub 53 and to the circle element 10, 11, 12.

The transfer of the motion from the first plate 44 to the second plate 45 determines the sliding of the second plate 45 along the sliding direction S depending on the force actually transmitted.

The detection sensor 50 measures the extent of such sliding and provides a corresponding electronic signal which is processed by the processing and control unit 57 to command or not the intervention of the electric motor 54, 55 depending on a mapping of pre-set parameters.

In the event of the electric motor 54, 55 being started, between the statoric element 54 and the rotoric element 55 a force is produced having the same direction of movement as the bike B which aids the pedalling of the user in making the wheel 1 rotate.

The invention claimed is:

1. Wheel (1) for pedal-assisted bikes, comprising:
   at least a fixed structure (2) associable with the frame (T) of a bike (B) having a driving pedal crank (P);
   at least a circle element (10, 11, 12) mounted on said fixed structure (2) in a rotatable way around a main rotation axis (A);
   at least a propulsion disc (13) mounted on said fixed structure (2) in a rotatable way and connectable to said driving pedal crank (P);
   motion transmission means (14, 15, 16) for the transmission of the rotary motion from said propulsion disc (13) to said circle element (10, 11, 12), comprising:
   at least a speed gear device (14) suitable for changing the motion transmission ratio from said propulsion disc (13) to said circle element (10, 11, 12); and
   at least a first detection device (16) suitable for detecting the force transmitted to said circle element (10, 11, 12) from said propulsion disc (13);
   at least an electric motor (54, 55) associated with said fixed structure (2) and suitable for cooperating with said propulsion disc (13) to motorize said circle element (10, 11, 12), said electric motor (54, 55) comprising a statoric element (54) associated with said fixed structure (2) and a rotoric element (55) associated with said circle element (10, 11, 12);
   at least a processing and control unit (57) associated with said fixed structure (2), operatively connected to said first detection device (16) and to said electric motor (54, 55) and suitable for controlling the activation of said electric motor (54, 55) according to the force detected by said first detection device (16);
   wherein said circle element (10, 11, 12) comprises at least a central boxed casing (10) suitable for containing said motion transmission means (14, 15, 16), said electric motor (54, 55) and said processing and control unit (57);
   wherein said statoric element (54) and said rotoric element (55) are substantially ring-shaped and arranged substantially around said motion transmission means (14, 15, 16); and
   wherein said wheel (1) comprises at least a power supply unit (56) associated with said fixed structure (2) and suitable for electrically supplying said electric motor (54, 55), said power supply unit (56) being contained in said central box casing (10),
   wherein said motion transmission means (14, 15, 16) includes the speed gear device (14) and the first detection device (16) and the statoric element (54) and the rotoric element (55) are arranged around the speed gear device (14) and said first detection device (16).

2. Wheel (1) according to claim 1, wherein:
   said motion transmission means (14, 15, 16) comprise at least a freewheel mechanism (15); and said propulsion disc (13) is associated with said speed gear device (14) which is associated with said freewheel mechanism (15) which is associated with said first detection device (16) which is associated with said circle element (10, 11, 12).

3. Wheel (1) according to claim 1 wherein said speed gear device (14) is substantially coaxial to said main rotation axis (A).

4. Wheel (1) according to claim 1, wherein said motion transmission means (14, 15, 16) comprise a second detection device (41, 42, 43) suitable for detecting the rotation speed at exit from said speed gear device (14).

5. Wheel (1) according to claim 1, further comprising a third detection device suitable for detecting the speed of said circle element (10, 11, 12).

6. Wheel (1) according to claim 1, wherein said speed gear device (14) comprises:
- an annulus gear (17) with internal teeth, which is associated with said propulsion disc (13);
- at least a first group of planet gears (18a, 18b, 18c, 18d), made integral with each other and having a different number of teeth, of which at least one primary planet gear (18a) engaging with said annulus gear (17);
- a planet carrier body (19, 20, 21) which supports said first group of planet gears (18a, 18b, 18c, 18d);
- a second group of sun gears (22a, 22b, 22c, 22d), having a different number of teeth and engaging with a respective planet gear (18a, 18b, 18c, 18d), of which at least one primary sun gear (22a) engaging with said primary planet gear (18a); and
- a locking device (23, 24) for the selective locking of said sun gears (22a, 22b, 22c, 22d), suitable for preventing alternately the rotation of only one of said sun gears (22a, 22b, 22c, 22d) and to release the rotation of the remaining ones, the transmission ratio between said annulus gear (17) and said planet carrier body (19, 20, 21) being established by which sun gear (22a, 22b, 22c, 22d) is locked.

7. Wheel (1) according to the claim 6, wherein said sun gears (22a, 22b, 22c, 22d) comprise a central hole (25) for housing said locking device (23, 24).

8. Wheel (1) according to the claim 7, wherein said locking device (23, 24) comprises at least a group of locking bodies (23), each of the locking bodies (23) housed in said central hole (25) of a respective sun gear (22a, 22b, 22c, 22d) and is mobile perpendicular to said main rotation axis (A) between a locking position, wherein the locking body (23) is fitted in at least a groove (26) obtained in said respective sun gear (22a, 22b, 22c, 22d) preventing the sun gear (22a, 22b, 22c, 22d) from rotating, and a release position, wherein the locking body (23) is moved away from said groove (26) and said respective sun gear (22a, 22b, 22c, 22d) is released.

9. Wheel (1) according to the claim 8, wherein said locking device (23, 24) comprises at least an operating shaft (24) for operating said locking bodies (23), which is housed in said central holes (25) coaxially to said sun gears (22a, 22b, 22c, 22d) and has at least a series of eccentric profiles (24a) suitable for cooperating with said locking bodies (23) for their movement between said locking position and said release position.

10. Wheel (1) according to the claim 9, wherein the angular positions of said eccentric profiles (24a) are substantially staggered the one to the other, said operating shaft (24) being rotatable around said operating shaft's (24) own axis in a series of operative angular positions wherein one of said eccentric profiles (24a) places the corresponding locking body (23) in locking position while the other locking bodies (23) remain in release position.

11. Wheel (1) according to claim 9, wherein said speed gear device (14) comprises a solidarization mechanism (28, 29) suitable for making said annulus gear (17) integral with said planet carrier body (19, 20, 21).

12. Wheel (1) according to the claim 11, wherein said solidarization mechanism (28, 29) comprises a solidarization element (28) fastened to said annulus gear (17) in a sliding way along a direction parallel to said main rotation axis (A) between a coupling position, wherein said solidarization element (28) is rigidly engaged with said primary sun gear (22a), and an idle position, wherein said solidarization element (28) is moved away and released from said primary sun gear (22a).

13. Wheel (1) according to the claim 12, wherein said solidarization mechanism (28, 29) comprises a helical profile (29) obtained on said operating shaft (24) and suitable for cooperating with said solidarization element (28) for said solidarization element (28) movement between said coupling position and said idle position in contrast to an elastic return body (30).

14. Wheel (1) according to claim 10, wherein said locking device (23, 24) comprises a retention mechanism (31, 32, 33) suitable for retaining said operating shaft (24) in said operative angular positions.

15. Wheel (1) according to the claim 14, wherein said retention mechanism (31, 32, 33) comprises at least a retention body (31) fastened to said operating shaft (24) in a sliding way along a direction parallel to said main rotation axis (A) between an engagement position, wherein said retention body (31) is fitted in a corresponding seat (33) obtained in said fixed structure (2), and a disengagement position, wherein said retention body (31) is moved away and released from said seat (33), said fixed structure (2) having a plurality of said seats (33), at least one for each of said operative angular positions.

16. Wheel (1) according to the claim 10, wherein said speed gear device (14) comprises a control system (34) for the selection of the transmission ratio by a user which has an actuator element for placing in rotation said operating shaft (24) around said operating shaft's (24) own axis between said operative angular positions, said actuator element (34) comprising a coupling body (35) associated with said operating shaft (24) and connectable to a control wire (36).

17. Wheel (1) according to the claim 10, wherein said speed gear device (14) comprises a control system (34) for the selection of the transmission ratio by a user which has an actuator element for placing in rotation said operating shaft (24) around said operating shaft's (24) own axis between said operative angular positions, said actuator element (34) comprising a motorized body.

18. Wheel (1) for pedal-assisted bikes, comprising:
- a fixed structure (2) associable with the frame (T) of a bike (B) having a driving pedal crank (P);
- a circle element (10, 11, 12) mounted on said fixed structure (2) in a rotatable way around a main rotation axis (A);
- a propulsion disc (13) mounted on said fixed structure (2) in a rotatable way and connectable to said driving pedal crank (P);
- motion transmission means (14, 15, 16) for the transmission of the rotary motion from said propulsion disc (13) to said circle element (10, 11, 12), comprising:
  - a speed gear device (14) suitable for changing the motion transmission ratio from said propulsion disc (13) to said circle element (10, 11, 12); and a first detection device (16) suitable for detecting the force transmitted to said circle element (10, 11, 12) from said propulsion disc (13);

an electric motor (54, 55) associated with said fixed structure (2) and suitable for cooperating with said propulsion disc (13) to motorize said circle element (10, 11, 12), said electric motor (54, 55) comprising a statoric element (54) associated with said fixed structure (2) and a rotoric element (55) associated with said circle element (10, 11, 12); and a processing and control unit (57) associated with said fixed structure (2), operatively connected to said first detection device (16) and to said electric motor (54, 55) and suitable for controlling the activation of said electric motor (54, 55) according to the force detected by said first detection device (16), wherein said circle element (10, 11, 12) comprises at least a central boxed casing (10) suitable for containing said motion transmission means (14, 15, 16), said electric motor (54, 55) and said processing and control unit (57), wherein said statoric element (54) and said rotoric element (55) are substantially ring-shaped and arranged substantially around said motion transmission means (14, 15, 16), and wherein said wheel (1) comprises at least a power supply unit (56) associated with said fixed structure (2) and suitable for electrically supplying said electric motor (54, 55), said power supply unit (56) being contained in said central box casing (10), wherein said first detection device (16) comprises:

at least a first plate (44) rotatable around said main rotation axis (A) and movable in rotation by the motion of said propulsion disc (13);

at least a second plate (45) associated with said circle element (10, 11, 12) by means of a prismatic coupling suitable for making said at least a second plate (45) rotatable around said main rotation axis (A) and sliding along a sliding direction substantially parallel to said main rotation axis (A);

at least a motion transmission body (48) for transmitting motion between said first plate (44) and said second plate (45), which is associated with said first plate (44) and is suitable for engaging a grip ramp (49) associated with said second plate (45) and inclined with respect to a plane transversal to said main rotation axis (A), the engagement of said grip ramp (49) by said motion transmission body (48) determining the sliding of said second plate (45) along said sliding direction (S) until the said second plate (45) takes up a position corresponding to the force transmitted to said second plate (45); and at least a detection sensor (50) for detecting the position of said second plate (45).

19. Wheel (1) according to the claim 18, wherein said first detection device (16) comprises elastic means (51) of contrast to the moving away of said second plate (45) from said first plate (44).

20. Wheel (1) according to claim 18, wherein said detection sensor (50) is a contact-less distance sensor suitable for measuring the distance from a dish (52) associated with said second plate (45).

\* \* \* \* \*